United States Patent
Vollaire et al.

(10) Patent No.: US 9,819,198 B2
(45) Date of Patent: Nov. 14, 2017

(54) ELECTRONIC SYSTEM COMPRISING A STANDBY MODE WITHOUT ELECTRICAL CONSUMPTION

(71) Applicants: ECOLE CENTRALE DE LYON, Ecully (FR); UNIVERSITÉ LYON 1 CLAUDE BERNARD, Villeurbanne (FR); INSTITUT NATIONAL DES SCIENCES APPLIQUÉES DE LYON, Villeurbanne (FR); UNIVERSITÉ DE LIMOGES, Limoges (FR); CENTRE NATIONAL DE LA RECHERCHE SCIENTIFIQUE, Paris (FR)

(72) Inventors: Christian Vollaire, Tassin (FR); Marc Thevenot, Limoges (FR); Vlad Marian, Ecully (FR); Cyrille Menudier, Limoges (FR)

(73) Assignees: Ecole Centrale De Lyon, Ecully (FR); Universite Lyon 1 Claude Bernard, Villeurbanne (FR); Institut National Des Sciences Appiquees De Lyon, Villeurbanne (FR); University De Limoges, Limoges (FR); Centre National De La Recherch, Paris (FR)

( * ) Notice: Subject to any disclaimer, the term of this patent is extended or adjusted under 35 U.S.C. 154(b) by 448 days.

(21) Appl. No.: 14/383,372

(22) PCT Filed: Mar. 7, 2013

(86) PCT No.: PCT/EP2013/054627
§ 371 (c)(1),
(2) Date: Nov. 25, 2014

(87) PCT Pub. No.: WO2013/132016
PCT Pub. Date: Sep. 12, 2013

(65) Prior Publication Data
US 2015/0069850 A1    Mar. 12, 2015

(30) Foreign Application Priority Data

Mar. 7, 2012 (FR) ...................................... 12 52084

(51) Int. Cl.
H02J 5/00       (2016.01)
H02M 7/217    (2006.01)
H04W 52/02   (2009.01)

(52) U.S. Cl.
CPC ............. *H02J 5/005* (2013.01); *H02M 7/217* (2013.01); *H04W 52/028* (2013.01); *H04W 52/0229* (2013.01); *Y02B 60/50* (2013.01)

(58) Field of Classification Search
CPC ... H02J 5/005; H02M 7/217; H04W 52/0229; H04W 52/028
(Continued)

(56) References Cited

U.S. PATENT DOCUMENTS

| | | |
|---|---|---|
| 5,790,946 A | 8/1998 | Rotzoll |
| 7,720,513 B2 * | 5/2010 | Enenkl ................. G06F 1/3203 455/343.1 |
| 2006/0101298 A1 | 5/2006 | Park et al. |

FOREIGN PATENT DOCUMENTS

EP    1857911 A1    11/2007

* cited by examiner

*Primary Examiner* — Hal Kaplan
(74) *Attorney, Agent, or Firm* — Gable Gotwals

(57) ABSTRACT

This invention relates to an electronic system including a radiative electromagnetic emitter for emitting an activation signal including sequentially an energy supply signal followed by an identification signal, the power of the energy supply signal being at least ten times greater than the power of the identification signal, further including an interface connected to an energy supply source; an electric load; a circuit for deactivating a placing of electric load on standby, including: a receiver including a reception interface, a (Continued)

rectifier configured to generate a DC activation voltage on the basis of an activation signal, a switch configured to selectively connect/disconnect to the load from the energy supply, an identification circuit configured to extract an identifier of the activation signal and configured to apply the activation voltage as closure control signal for turning off the switch if a match of the identifier is determined.

14 Claims, 4 Drawing Sheets

(58) Field of Classification Search
USPC .......................................................... 307/104
See application file for complete search history.

ELECTRONIC SYSTEM COMPRISING A STANDBY MODE WITHOUT ELECTRICAL CONSUMPTION

CROSS-REFERENCE TO RELATED APPLICATIONS

This application is the United States National Phase of PCT Patent Application No. EP2013/054627 filed on 7 Mar. 2013, which claims priority to French Patent Application No. 1252084 filed 7 Mar. 2012, both of which are incorporated herein by reference.

The invention relates to electrically powered appliances comprising a standby mode activated or deactivated by a remote control.

A large number of electronic or electrical appliances are powered by the public electrical network and associated with a remote control unit. The remote control unit makes it possible to interfere with the electronic appliance remotely during its operation, for example to modify some of its operational parameters. These appliances are usually audio-visual products (television, decoder, modulator/demodulator, hi-fi system, optical disk reader etc.), or home automation products (lighting, roller blinds, gate, garage door, air conditioning/heating diffuser etc.).

In a large number of cases, the remote control unit also makes it possible to place the appliance in a standby mode or to bring the appliance out of this standby mode. During the standby mode, the appliance is still powered by the electrical network and consumes little energy. Such a standby mode makes it possible to avoid the user having to come all the way to the appliance to actuate a mechanical switch for switching it off or on.

However, a circuit for receiving the commands emitted by the remote control unit remains powered by the electrical network, in order to allow the processing of the commands to come out of standby mode emitted by the remote control unit. From the technical point of view, the reception circuit consumes power because it constantly searches the noise (radiofrequency or infrared spectrum) until it detects an intelligible frame. Consumption is thus induced on the one hand by a reception interface, by a processing circuit and by losses in the power supply held connected to the electrical network. Thus, the consumption of the remotely activated appliances in their standby mode is not zero.

This power consumption in standby mode is subject to increasingly restrictive regulations aiming to limit its amplitude for each electronic appliance.

However, studies show that power consumption of appliances in standby represents a prevalent and growing share of worldwide energy consumption. This consumption is notably increasing due to the extremely large increase in the number of electronic and home automation appliances in service. This power consumption was estimated at 50 TWh in 2008 in the territory of the European Union alone. In the context of a growing awareness of environmental problems, it is desirable to substantially reduce this energy consumption. The manufacturers of electronic appliances are notably expending considerable effort on the design and the selection of components to reduce the power consumption of reception circuits in standby mode.

The document EP1857911 describes a method for activating an electronic appliance placed in a standby mode. A remote control unit emits an activation signal while the electronic appliance is insulated from the power supply of a network by a switch to have zero electrical consumption. The remote control unit emits an activation signal with sufficient power to power a radiofrequency circuit at reception. The sinusoidal activation signal is rectified to power the radiofrequency circuit. The activation signal comprises an identification code of the appliance to be woken up. The identification code received is compared with an identification code previously stored in a memory. If the identification codes match, a switch is closed in order to connect the appliance to the power supply of the network. The closing energy of the switched is stored in a charge storage area when the appliance is in the process of being powered. The identification code is superimposed onto the activation signal transporting the appropriate energy for powering the radiofrequency circuit.

However, such an activation system is only described very briefly and its dimensioning for a home application does not appear in sufficient detail. Furthermore, this activation system only allows the recovery of a fairly small amount of energy from the activation signal or requires an activation signal duration that is too long for the user.

The invention aims to solve one or more of these drawbacks. The invention thus pertains to an electronic system, as defined in the appended claims.

Other features and advantages of the invention will become clearly apparent from the following description thereof, for information purposes and in no way limiting, with reference to the appended drawings, wherein:

FIG. 1 is a flow diagram of an electronic system according to an exemplary embodiment of the invention;

FIG. 2 schematically illustrates a emitter of a standby mode command and an electromagnetic signal generated by this emitter in an exemplary embodiment of the invention;

Figure 1:
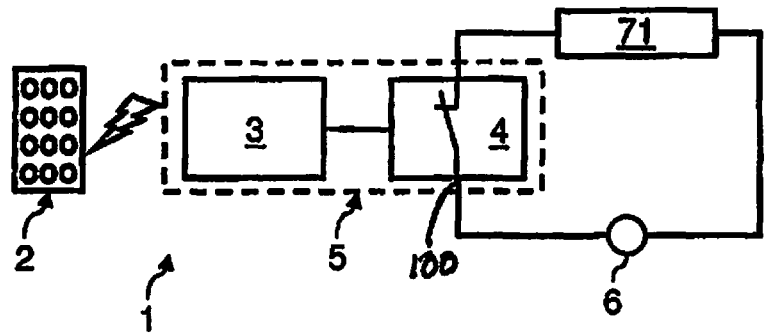

FIG. 1 is a schematic representation of an example of an electronic system for implementing the invention. The electronic system 1 comprises an emitter 2 of a standby mode command and an electrical load 71 (typically an electronic appliance) that one wishes to selectively place in standby or activate from a standby mode, remotely. For this purpose, the system 1 includes a circuit for managing the placing in standby 5. The circuit 5 comprises a switch configured for selectively connecting/disconnecting the load 71 from an electrical power supply 6. The circuit 5 comprises a reception circuit 3 and a commutation circuit 4. The reception circuit 3 is intended to notably receive commands to place in standby or activate the load 71. The commutation circuit 4 is intended to selectively connect/disconnect to the load 71 from the electrical power supply. A connection interface 100 is interposed between the commutation circuit 4 and the electrical power supply 6, in order to allow a selective attachment of the system 1 to the electrical power supply 6.

The circuit 5 according to the invention has zero power consumption when the electrical load 71 is in standby. According to the invention, the circuit 5 and particularly its reception circuit 3 are not powered by the electrical power supply 6. The energy required for powering the reception circuit 3 and obtaining a commutation in the circuit 4 is extracted from the activation signal emitted by the command emitter 2.

Figure 2:
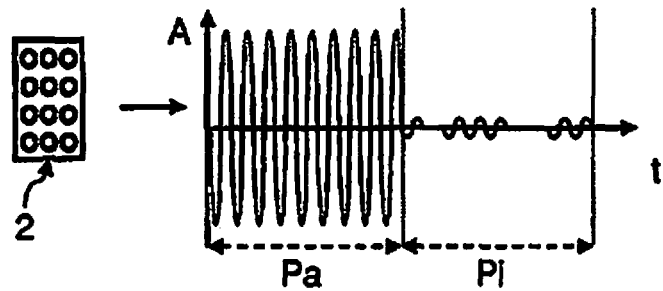

FIG. 2 schematically illustrates the emitter 2 of the standby mode command and an electromagnetic signal generated by this emitter 2 in the event of a command to activate the load 71 initially placed in standby mode. When the load 71 is activated by soliciting the emitter 2, an electromagnetic activation signal is emitted. This activation signal includes in sequence a power supply signal during the phase Pa, followed by an identification signal during the phase Pi.

The emitter 2 is radiative and emits the activation signal in the UHF frequency band, which makes it possible to obtain sufficient range for a home automation application (ranging for example from one to several meters), a high yield at the conversion at reception, and the availability of a great variety of widely available and optimized electronic components. Advantageously, the activation signal emitted is a microwave signal emitted in the frequency band ranging from 2.4 GHz to 2.49 GHz, for example in the ISM band. Besides using widely available components, such a frequency band allows the use of emission and reception antennas whose bulk is compatible with integration into home automation appliances.

The power of the power supply signal is at least ten times greater than the power of the identification signal, and preferably at least a hundred times greater. Thus, for an energy consumed during the emission of the activation signal, a larger energy can be assigned to the power supply signal, which makes it possible to increase the range of the emitter 2 and the energy recovered at the receiver 3.

To maintain optimal user-friendliness, the cumulative duration of the phases Pa and Pi is advantageously less than or equal to 200 ms, and preferably less than or equal to 100 ms, to make the activation duration barely perceptible in response time. The proportion of the phase Pa in the duration of the activation signal is advantageously very much greater than that of the phase Pi, to optimize the recovery of energy in a fairly short time. For an activation signal of a duration of 100 ms, the duration of the phase Pa may lie between 95 and 99 ms, for a duration of the phase Pi lying between 1 and 5 ms. The duty cycle of the phase Pa will thus advantageously be at least equal to 95% of the activation signal, or even, preferably, at least equal to 99%.

It can be envisioned that the phases Pa and Pi be produced with the same carrier frequencies. It can also be envisioned that the carrier frequencies of the phases Pa and Pi be different and that only the phase Pa be produced with the carrier frequencies detailed previously.

Any appropriate encoding can be used for the identification signal.

The identification signal can for example be encoded using modulation by frequency hopping. The received identification signal can be compared to a series of frequencies stored in a memory for the load to be activated.

The identification signal can also be encoded in all-or-nothing encoding. The decoding can be performed using a variable center frequency mixer, combined with an intermediate-band amplifier and combined with a passive diode detector. The decoding can also be performed simply using a diode detector and a low-frequency amplifier side by side. A diode detector makes it possible to directly extract an identification signal of a few kilohertz from the identification signal emitted in microwaves by the emitter 2. Low-frequency amplification makes it possible to reduce the power consumption of the identification circuit 32. The amplifier transforms this low-frequency identification signal to a logic level of a microcontroller.

The maximum emissive power of the emitter 2 may be limited to 1 W in the aim of limiting user exposure. The maximum emissive power of the emitter 2 can also be at least equal to 500 mW in order to have access to a large control range.

For a minimum range of 5 m of the emitter 2, starting from a gain of 6 dBi between the emitter and the receiver, a received power of around 30 µW (−15 dBm) is obtained at 5 m for an emitter emitting at 500 mW with a frequency of 2.45 GHz, taking the envisioned conversion efficiencies into account.

The emitter 2 can include an antenna of Yagi-Uda type. Such an antenna makes it possible to obtain horizontal radiation and can also be housed in a flat casing.

To generate the activation signal, the emitter 2 includes a radiofrequency amplifier consuming a relatively high current. To supply a strong peak current, the emitter 2 includes an organ for storing a buffer charge, for example a capacitor.

The emitter 2 will generally have to be able to generate a supply voltage for its radiofrequency amplifier in the order of 3.3V or 5V. Such a supply voltage can be produced with a relatively high efficiency by means of a DC/DC converter of boost type.

Figure 3:
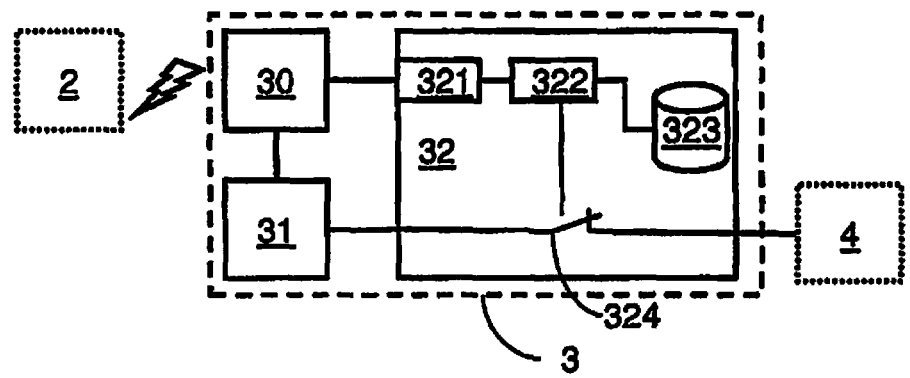
FIG. 3 is a function diagram of a reception circuit.

FIG. 3 is a schematic representation of a reception circuit 3 intended to implement the invention. The reception circuit 3 includes an interface 30 for the reception of an electromagnetic signal, an AC/DC converter 31, and an identification circuit 32. The reception interface 30 has a passband matching the frequency of emission of the activation signal by the command emitter 2. The reception interface 30 transduces the electromagnetic activation signal into an alternating-current electrical signal. The reception interface 30 applies an alternating-current electrical signal generated on the converter 31 and an alternating-current electrical signal on the identification circuit 32. It can be envisioned that the reception interface be produced on one side of a substrate and that the components assembled at the surface of the converter 31 and of the identification circuit 32 be assembled on the opposite side of this substrate.

On receiving an appropriate activation signal at the reception interface 30, the converter 31 transforms the alternating-current electrical signal supplied by the reception interface 30 into a direct-current control voltage, in a manner known per se. The converter 31 can be based on a diode half-wave rectifier, having a relatively high conversion efficiency. A full-wave rectifier can also be used to obtain a higher output voltage, at the cost of a reduced conversion efficiency.

The converter 31 can comprise an accumulator at its output in order to accumulate the generated electrical charge. A switch 324 is interposed between the output of the converter 31 and the commutation circuit 4. The direct-current voltage generated at the output by the converter 31 is intended to power a switch to ensure its commutation in such a way as to establish the supply of power to the load 71 by way of the power supply 6, and thus to activate the load 71.

The identification circuit 32 includes a demodulator 321. The demodulator 321 ensures the demodulation of the identification signal included in the alternating-current electrical signal supplied by the reception interface 30. The demodulator 321 can include an appropriate filter to clip the received signal or perform a low-pass filtering. A processing circuit 322 processes the signal supplied by the demodulator 321 and compares it with the identifier of an electrical load, stored in a memory 323. The identifier stored in the memory 323 can be unique and can correspond to a series number of the load 71. The processing circuit 322 generates an activation signal only when there is a match between a received identification signal and the identifier stored in the memory. The identification circuit 32 thus makes it possible to discriminate between an activation signal intended for the load 71 from other activation signals intended for other loads (in particular in the ISM band), or from electromagnetic noise. The identification circuit 32 is advantageously included in a low-consumption integrated circuit.

The combination of the reception interface 30 and the converter 31 can be implemented in the form of a rectifying antenna (or rectenna). To optimize the global efficiency of such a rectenna, the antenna has a radiative impedance equivalent to the impedance of the converter 31. The converter 31 can include a high-pass filter at the input, connected to a diode half-wave rectifier. The converter 31 can include a low-pass filter at the output of the diode rectifier, in order to smooth the voltage of the activation signal.

Figure 4:
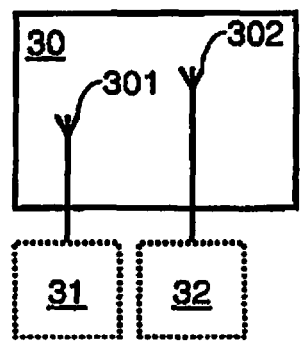
FIG. 4 is a diagram of a first variant of a reception interface.

FIG. 4 is a diagram of a first variant of a reception interface 30. In this first variant, the reception interface 30 includes a first antenna 301 intended for the reception of the power supply signal, and a second antenna 302 intended for the reception of the identification signal. This variant notably makes it possible to use different frequencies for the power supply signal and the identification signal, or to perform identification encoding by frequency hopping.

Figure 5:
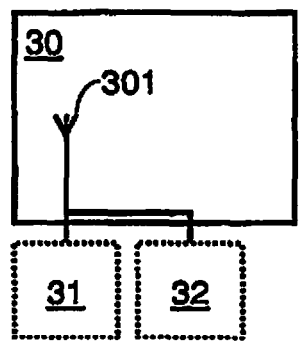
FIG. 5 is a diagram of a second variant of a reception interface.

FIG. 5 is a diagram of a second variant of a reception interface 30. In this second variant, the reception interface 30 includes an antenna 301 intended both for the reception of the power supply signal and for the reception of the identification signal.

Figure 14:
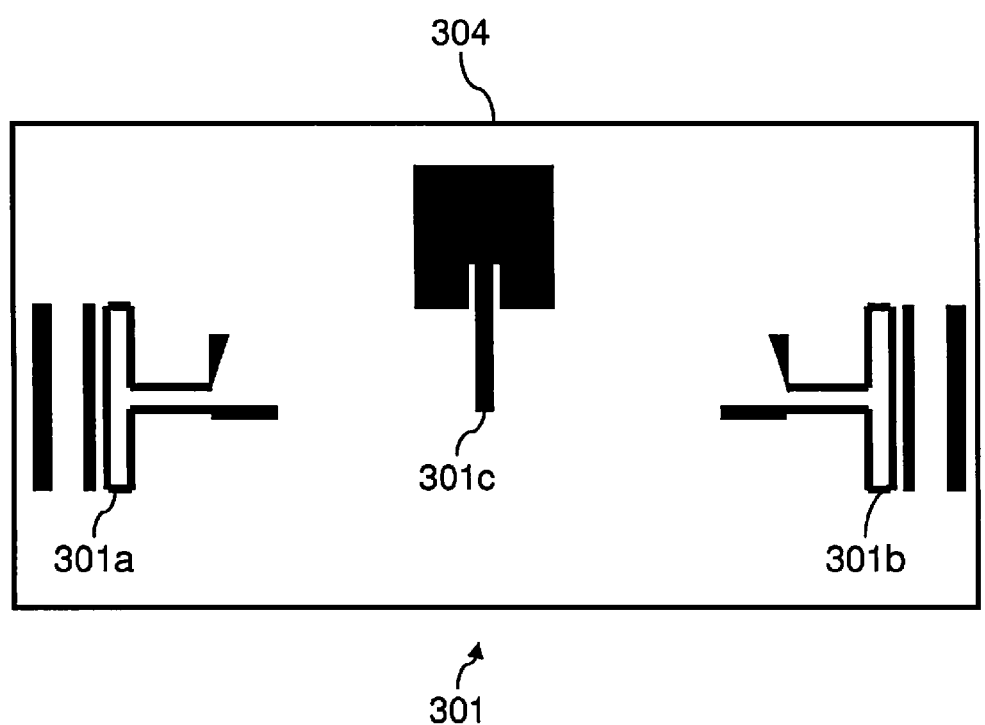
FIG. 14 is a front view of an example of an antenna combining several antenna circuits with separate directivities.

The antenna 301 and/or the antenna 302 are advantageously configured to have a reception lobe having a relatively wide angle. Advantageously, such a reception lobe will comprise an angle greater than 120°, and advantageously close to 180°. Such a reception lobe can notably be obtained by placing several antenna elements having separate directivities side by side. FIG. 14 illustrates an example of an antenna 301 comprising several antenna elements 301a, 301b, 301c. For simplification purposes, only one side of a substrate 304 on which the antenna elements 301a, 301b, 301c are set out is illustrated. Each element 301a, 301b and 301c has its own directivity, these directivities being complementary to allow reception with an angle of 180° in a plane normal to the substrate 304. The elements 301a, 301b, 301c are equipped with ground planes arranged on the opposite side of the substrate 304.

Figure 6:
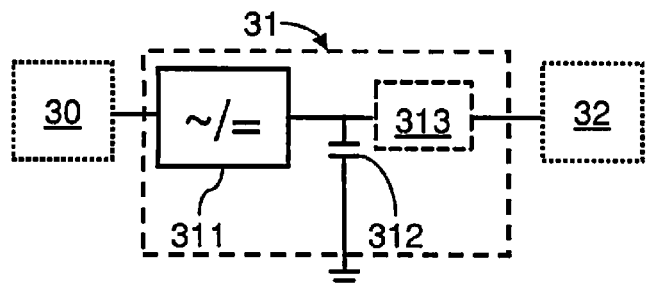
FIG. 6 is a schematic representation of a variant of a converter of a reception circuit.

FIG. 6 is a schematic representation of a variant of a converter 31 that can be integrated into the reception circuit 3. The converter 31 comprises an alternating-current/direct-current converter circuit 311 at its input. A capacitor 312 is connected between the output of the circuit 311 and the ground. The converter 31 comprises a step-up voltage converter circuit 313, the input of which is connected to the output of the circuit 311. Due to the restrictions related to the radiation of the emitter 2 or to the design of the circuit 311, the voltage supplied by this circuit 311 on receiving a power supply signal can turn out to be insufficient (for example in the order of 100 to 200 mV) to ensure the commutation of a switch. The step-up circuit 313 makes it possible to convert the direct-current voltage supplied by the circuit 311 into a direct-current voltage having sufficient amplitude to ensure the closing of a switch and thus lead to the connection of the load 71 to the power supply 6. According to the type of switch controlled by the voltage supplied by converter 31, a step-up converter supplying an output voltage in the order of 500 mV can turn out to be adequate.

Figure 7:
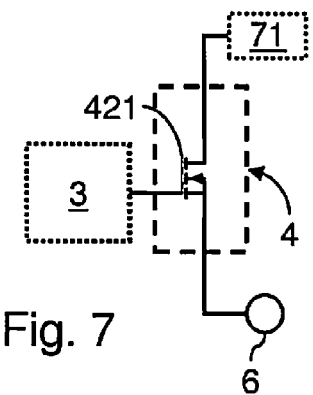
FIG. 7 is a schematic representation of a variant of a commutation circuit 4.

FIG. 7 is a schematic representation of a commutation circuit 4 according to a possible embodiment. In this example, the commutation circuit 4 comprises a switch for connecting/disconnecting between the power supply 6 and the load 71. This switch is intended to connect the load 71 to the power supply 6, at least during an initial phase of activation of this load 71, i.e. when it comes out of standby. In this case, this switch is implemented in the form of a MOS transistor 421 (in this case an nMOS), whose gate is controlled by an activation signal originating from the reception circuit 3. An activation signal of sufficient amplitude originating from the reception circuit 3 thus makes it possible to ensure the closing of the transistor 421.

The various switches described in the context of the invention are advantageously implemented in the form of MOS transistors for the low control energy consumed when they commutate. The MOS transistor 421 may have a switch-closing energy of a power less than or equal to 0.2 μJ (60 nC under 3 volts across its gate).

The MOS transistor 421 must have a low enough leakage current for it to be possible to consider that the power consumption in standby is zero. Consumption less than or equal to 1 mW will be considered as zero consumption in standby.

Figure 8:
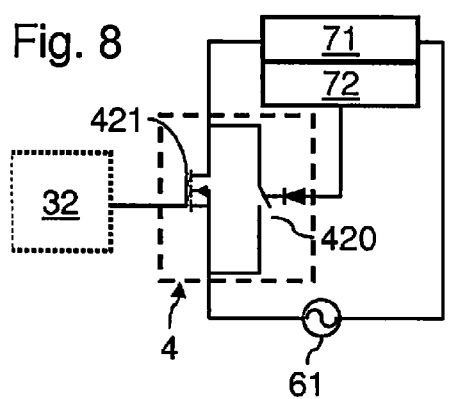
FIG. 8 is a schematic representation of an example of a system powered by a public electrical network.

FIG. 8 represents a first variant of a system 1 wherein the load 71 is powered by an alternating-current public network 61. In this variant, the commutation circuit 4 includes a switch 420 connected in parallel with the switch 421 between the load 71 and the source 61. When the system 1 is in standby, the switches 420 and 421 are open. Upon receiving an activation signal, the switch 421 is briefly closed, so that the load 71 is powered by the source 61. A circuit for automatically holding the power supply 72 is then also powered by the source 61. This holding circuit 72 then applies a command to close the switch 420. For as long as a command to place in standby is not received by the system 1, the holding circuit 72 holds the switch 420 closed. Thus, when the energy received from the command emitter 2 then turns out to be insufficient to hold the switch 421 closed, the powering of the load 71 by the source 61 is ensured by way of the switch 420. During a command to place in standby, the holding circuit 72 can open the switch 420, the switch 421 already being open.

Figure 9:
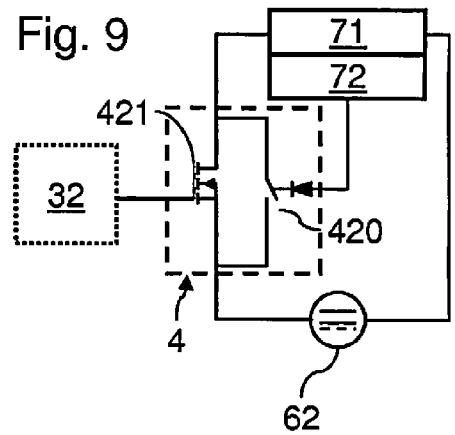
FIG. 9 is a schematic representation of an example of a system powered by a battery.

FIG. 9 represents a second variant of a system 1 wherein the load 71 is powered by an accumulator battery 62. In this variant, the commutation circuit 4 includes a switch 420 connected in parallel with the switch 421 between the load 71 and the source 62. When the system 1 is placed in standby, the switches 420 and 421 are open. On receiving an activation signal, the switch 421 is briefly closed, so that the load 71 is powered by the source 62. A circuit for automatically holding the power supply 72 is then also powered by the source 62. This holding circuit 72 then applies a command to close the switch to the switch 420. For as long as a command to place in standby is not received by the system 1, the holding circuit 72 holds the switch 420 closed. Thus, when the energy received from the command emitter 2 turns out to be insufficient to hold the switch 421 closed, the powering of the load 71 by the source 62 is ensured by way of the switch 420.

When the load 71 is intended to be powered by a public electrical network, the switch 421 must be configured to be crossed by some alternating current. Moreover, this switch 421 must be dimensioned to resist the application of a voltage in the order of 500V across its terminals, or even 600V, and be able to provide breaking for such a voltage value. A MOS transistor used as a switch 421 and having such dimensions requires a voltage in the order of 3V between a gate and a source to commutate to the passing step.

Figure 10:
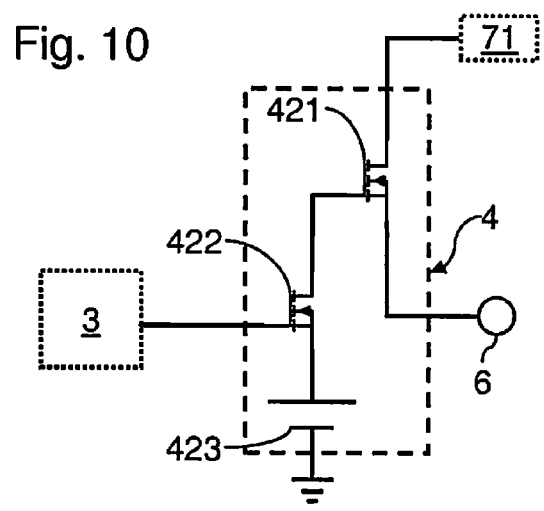
FIG. 10 is a schematic representation of a variant of a commutation circuit.

FIG. 10 illustrates a variant of the commutation circuit 4 making it possible to ensure the closing of such a switch 421 even when the amplitude of the activation signal supplied by the reception circuit 3 is relatively small. For this purpose, the commutation circuit 4 furthermore includes a MOS transistor 422 and a battery 423. The source of the transistor 422 is connected to the positive terminal of the battery 423. The drain of the transistor 422 is connected to the gate of the transistor 421. The gate of the transistor 422 receives the activation signal originating from the reception circuit 3. The battery 423 makes it possible to apply an adequate level of voltage to the gate of the transistor 421 upon the closing of the transistor 422, in order to obtain the closing of this transistor 421. The command energy for closing the transistor 422 can thus be limited to a relatively limited value, easily compatible with the quantity of energy being able to be extracted from the power supply signal received on the interface 30.

The battery 423 can be permanently assembled in the system 1 and have a lifetime equivalent to or longer than that of the system 1. Battery powering is possible since the switches of the commutation circuit 4 are in practice only closed during an extremely small cumulative time period during the lifecycle of the system 1. The battery 423 can also be recharged during the powering of the load 71 by the power supply.

The identification circuit 32 can be powered either by way of the output voltage of the converter 31, or by way of a battery (for example a battery such as a button battery permanently assembled in the reception circuit 3 and having a longer lifetime than the system 1).

Figure 11:
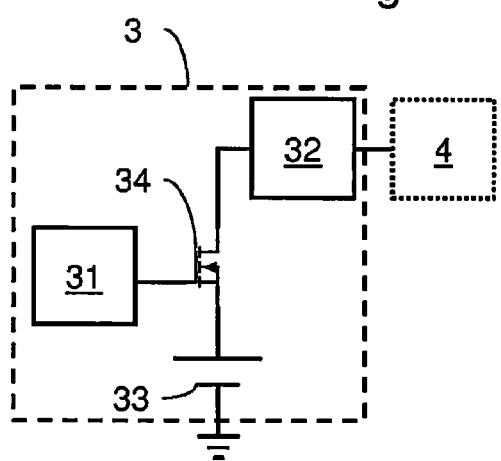
FIG. 11 is a schematic representation of a variant of a reception circuit.

FIG. 11 illustrates a variant wherein the identification circuit 32 is powered by a battery 33. A switch 34 is connected between the positive terminal of the battery 33 and the input of the identification circuit 32. The closing of the switch 34 is controlled by the activation signal generated at the output of the converter 31. In this case, the switch 34 is a MOS transistor whose gate is connected to the output of the converter 31, whose source is connected to the positive terminal of the battery 33, and whose drain is connected to the input of the identification circuit 32. On receiving an activation signal, the transistor 34 closes. The voltage of the battery 33 can then power the identification circuit 32 and control the closing of the transistor 421 when the identification circuit 32 validates the identification of the load 71. Powering by permanent battery is possible, since the identification circuit 32 only operates in practice during an extremely small cumulative period of time during the lifecycle of the system 1.

In this variant, it is possible to envision an identification circuit split into two stages. A first stage allows a very simple demodulation to be performed, and thus advantageously has a very small consumption so that it can be powered by the battery 33 on receiving an activation signal. The first stage blocks the powering of a second stage of demodulation if the signal received on the interface 30 does not satisfy the basic conditions of a match with the expected identification signal. The second stage effects a more precise demodulation of the identification signal when the first stage has validated the received signal. To avoid accidentally powering the second stage, which can potentially consume more energy, the first stage filters the received signals that manifestly do not match the expected identification signal.

Figure 12:
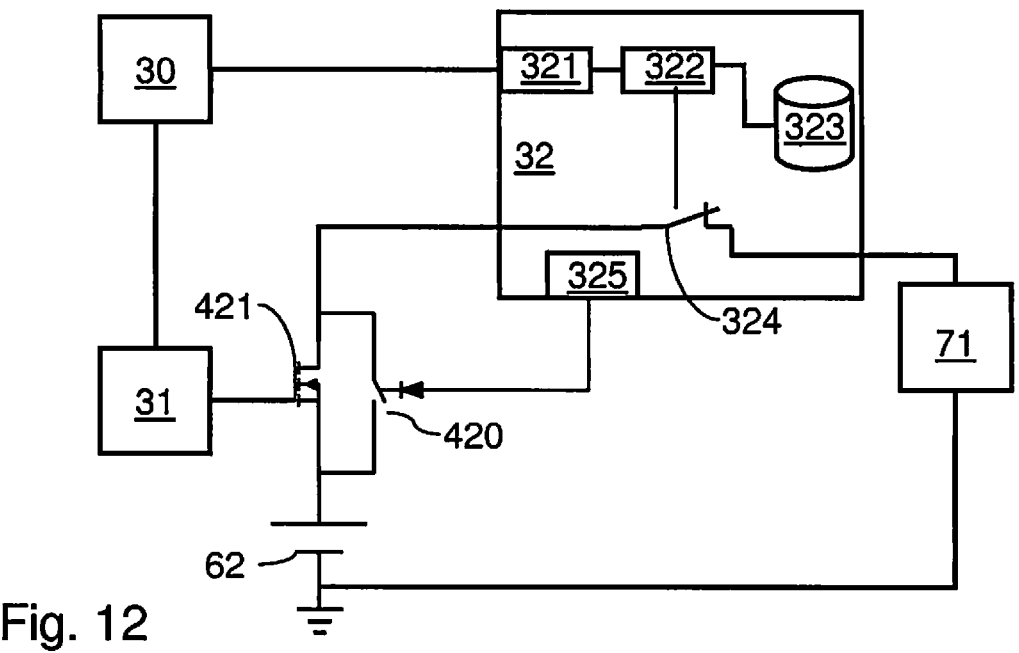
FIG. 12 is a schematic representation of a variant of a system provided for a battery power supply.

FIG. 12 is a variant of the system 1 optimized for powering the load 71 by a battery 62. As in the preceding examples, the reception interface 30 supplies the identification signal to the identification circuit 32 and the power supply signal to the converter 31. As in the example in FIG. 9, the commutation circuit 4 includes a switch 420 and a switch 421 connected in parallel. The switch 421 is a MOS transistor whose gate is connected to the output of the converter 31, whose source is connected to the positive terminal of the battery 62 and whose drain is connected to the input of the identification circuit 32. The demodulator 321 receives the identification signal supplied by the reception interface 30. The identification circuit 32 includes a circuit for automatically holding the power supply 325.

When the converter 31 generates the activation voltage, the transistor 421 is briefly closed. The identification circuit 32 is then powered by the battery 62. The identification circuit 32 then determines that the received identification signal does indeed correspond to the load 71 and performs the closing of the switch 324. The holding circuit 325 holds the switch 420 closed, so that the load 71 remains powered by the battery 62.

Figure 13:
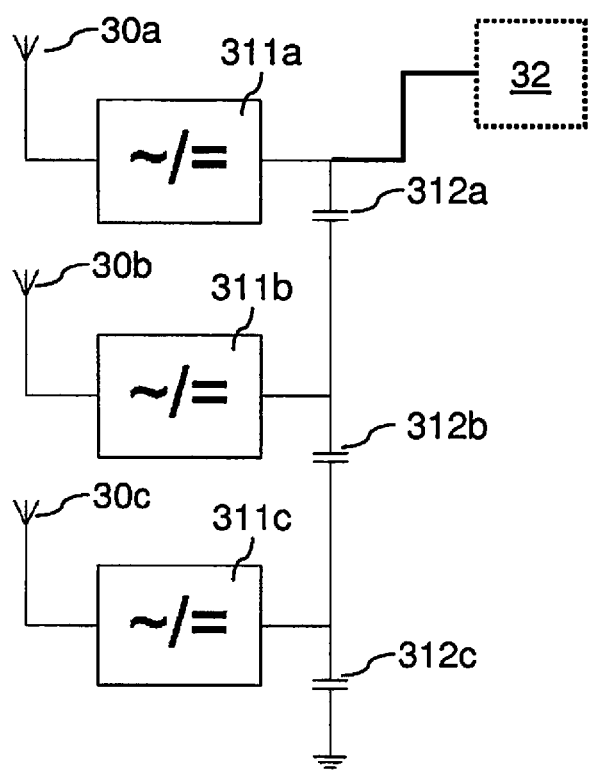
FIG. 13 is a schematic representation of a variant of a system having a reception circuit with increased tolerance.

FIG. 13 illustrates an improvement of a reception circuit 3 having an increased tolerance to frequency or polarization dispersion for example. The reception circuit 3 in practice comprises several reception antennas, each reception antenna being coupled with a respective alternating-current/direct current converter. Each alternating-current/direct-current converter includes an accumulator for storage of respective energy. These accumulators are connected in series between a ground and an input of the identification circuit 32. Each output of a converter is connected to the positive terminal of its respective accumulator.

In the example, the reception circuit 3 comprises antennas 30*a*, 30*b*, 30*c*, converters 311*a*, 311*b*, 311*c*, and capacitors 312*a*, 312*b*, 312*c* used as accumulators. The antenna 30*a* is connected to the input of the converter 311*a*. The output of the converter 311*a* is connected to the positive terminal of the capacitor 312*a*. The positive terminal of the capacitor 312*a* is connected to the input of the identification circuit 32. The antenna 30*b* is connected to the input of the converter 311*b*. The output of the converter 311*b* is connected to the positive terminal of the capacitor 312*b*. The positive terminal of the capacitor 312*b* is connected to the negative terminal of the capacitor 312*a*. The antenna 30*c* is connected to the input of the converter 311*c*. The output of the converter 311*c* is connected to the positive terminal of the capacitor 312*c*. The positive terminal of the capacitor 312*c* is connected to the negative terminal of the capacitor 312*b*. The negative terminal of the capacitor 312*c* is connected to the ground.

The antennas 30*a*, 30*b*, 30*c* have passbands with different frequencies or different sensitivities to the polarization of the incident electromagnetic waves. The voltages generated by the various converters accumulate. Consequently, even if an antenna is not irradiated by a ray of electromagnetic radiation with the polarization or the frequency that matches it, this antenna does not interfere destructively with the energy recovered from a power supply signal by the reception circuit 3. The phase differences between the electrical signals generated by the various antennas notably have no destructive effect on the recovery of energy. Consequently, such a reception circuit 3 has where applicable a better tolerance to polarization or frequency dispersion.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. An electronic system (1), said system comprising:
   a radiative electromagnetic emitter (2) configured for selectively emitting an activation signal in the UHF frequency band, the activation signal including in series a power supply signal followed by an identification signal, the power of the power supply signal being at least ten times greater than the power of the identification signal;
   an interface for connecting to an electrical power supply source (6);
   an electrical load (71) intended to be powered by the power supply source;
   a circuit (5) for deactivating placing of the electrical load on standby, including:
      a receiver (3) comprising:
         a reception interface;
         a rectifier connected to the reception interface and configured for generating a direct-current activation voltage from an activation signal received at the reception interface;
      an activation switch (4) configured for selectively connecting/disconnecting the load (71) of the power supply as a function of a state of a control signal;
      an identification circuit configured for extracting an identifier from the activation signal and determining an agreement between an extracted identifier and an identifier stored in a memory, and configured for applying the activation voltage as a signal controlling closing of the activation switch (4) if an agreement is determined.

2. The system as claimed in claim 1, wherein the rectifier (31) includes a rectifier circuit (311) and a device (312) for storing an electrical charge connected to an output of the rectifier circuit (311).

3. The system as claimed in claim 2, wherein the rectifier (31) includes a step-up direct-current/direct-current voltage converter (313), having an input connected to the storage device (312) and connected to the output of the rectifier circuit (311), and having an output supplying the activation voltage.

4. The system as claimed in claim 1, including a switch (420) for holding activation connected in parallel with said activation switch (421), and furthermore including a control circuit (72) holding a holding switch (420) closed when the electrical load (71) is connected to the connection interface.

5. The system as claimed in claim 1, wherein the activation switch is a first MOS transistor (421) whose source is connected to the connection interface and whose drain is connected to the load (71), the system furthermore comprising a second MOS transistor (422) whose gate receives the activation voltage, whose source is connected to a device (423) for storing an electrical charge and whose drain is connected to the gate of the first MOS transistor.

6. The system as claimed in claim 5, wherein the first MOS transistor has a maximum applicable drain-source voltage at least equal to 500V.

7. The system as claimed in claim 1, wherein the reception interface (30) comprises a first antenna (301) connected to the rectifier (311) and a second antenna (302) connected to the identification circuit (32).

8. The system as claimed in claim 1, wherein the reception interface (30) comprises an antenna (301) connected to the rectifier (311) and to the identification circuit (32).

9. The system as claimed in claim 1, wherein the activation switch (421) has a leakage current of less than 1 mW.

10. The system as claimed in claim 1, wherein a duty cycle of the power supply signal (Pa) in the activation signal emitted by the electromagnetic emitter (2) is at least equal to 95%.

11. The system as claimed in claim 1, wherein duration of the activation signal emitted by the electromagnetic emitter (2) is less than or equal to 100 ms.

12. The system as claimed in claim 1, wherein the power of the power supply signal of the activation signal emitted by the electromagnetic emitter (2) is at least equal to 0.5 W.

13. The system as claimed in claim 1, wherein the identification circuit (32) includes:
   a demodulator (321) configured for demodulating the identification signal and extracting the extracted identifier;
   a memory (323) storing the stored identifier;
   a processing circuit (322) comparing the extracted identifier with the identifier stored in the memory.

14. The system as claimed in claim 1, wherein the rectifier (31) applies the activation voltage generated as power supply voltage of the identification circuit (32).

* * * * *